United States Patent
Harada et al.

(10) Patent No.: US 11,057,931 B2
(45) Date of Patent: Jul. 6, 2021

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/087,831

(22) PCT Filed: Mar. 29, 2017

(86) PCT No.: PCT/JP2017/012874
§ 371 (c)(1),
(2) Date: Sep. 24, 2018

(87) PCT Pub. No.: WO2017/170678
PCT Pub. Date: Oct. 5, 2017

(65) Prior Publication Data
US 2019/0116615 A1    Apr. 18, 2019

(30) Foreign Application Priority Data
Mar. 31, 2016    (JP) .............................. JP2016-071679

(51) Int. Cl.
*H04W 74/08*    (2009.01)
*H04W 16/14*    (2009.01)
(Continued)

(52) U.S. Cl.
CPC ....... *H04W 74/0808* (2013.01); *H04W 16/14* (2013.01); *H04W 72/042* (2013.01);
(Continued)

(58) Field of Classification Search
None
See application file for complete search history.

(56) References Cited

U.S. PATENT DOCUMENTS

2011/0216649 A1* 9/2011 Wen ...................... H04W 74/02
370/230
2012/0243448 A1* 9/2012 Pan ....................... H04W 48/16
370/280
(Continued)

OTHER PUBLICATIONS

International Search Report issued in PCT/JP2017/012874 dated Jun. 20, 2017 (1 page).
(Continued)

*Primary Examiner* — Lonnie V Sweet
(74) *Attorney, Agent, or Firm* — Osha Bergman Watanabe & Burton LLP

(57) ABSTRACT

The present invention is designed to perform random access procedures adequately in a carrier in which LBT (Listen Before Talk) is configured. A user terminal, according to one aspect of the present invention, has a control section that controls random access procedures for a carrier where listening is performed before uplink transmission, a receiving section that receives downlink control information including information about a period that is formed with a plurality of transmission time intervals (TTIs) in which a random access preamble can be transmitted, and a transmission section that transmits the random access preamble in the period, in the carrier, in response to receipt of the downlink control information.

8 Claims, 16 Drawing Sheets

(51) Int. Cl.
  *H04W 74/00* (2009.01)
  *H04W 76/27* (2018.01)
  *H04W 72/04* (2009.01)
  *H04W 80/02* (2009.01)

(52) U.S. Cl.
  CPC ... *H04W 72/0446* (2013.01); *H04W 72/0453* (2013.01); *H04W 74/006* (2013.01); *H04W 76/27* (2018.02); *H04W 74/0833* (2013.01); *H04W 80/02* (2013.01)

(56) References Cited

U.S. PATENT DOCUMENTS

| | | | |
|---|---|---|---|
| 2013/0148620 A1* | 6/2013 | Nanri | H04W 74/006 370/329 |
| 2016/0007383 A1* | 1/2016 | Chae | H04W 76/14 455/404.1 |
| 2016/0021681 A1* | 1/2016 | Nan | H04W 74/008 370/329 |
| 2016/0113037 A1* | 4/2016 | Mizusawa | H04L 5/14 370/280 |
| 2016/0128098 A1* | 5/2016 | Nagasaka | H04W 76/10 370/329 |
| 2016/0262179 A1* | 9/2016 | Choi | H04W 74/004 |
| 2017/0265223 A1* | 9/2017 | Zhang | H04W 74/0833 |
| 2018/0092128 A1* | 3/2018 | Um | H04W 74/0808 |
| 2019/0053284 A1* | 2/2019 | Wang | H04W 74/0808 |

OTHER PUBLICATIONS

Written Opinion of the International Searching Authority issued in PCT/JP2017/012874 dated Jun. 20, 2017 (4 pages).
LG Electronics; "Random access in LAA"; 3GPP TSG RAN WG1 meeting #84, R1-160625; St Julian's, Malta; Feb. 15-19, 2016 (5 pages).
AT&T; "Drivers, Benefits and Challenges for LTE in Unlicensed Spectrum"; 3GPP TSG-RAN Meeting #62, RP-131701; Busan, Korea; Dec. 3-6, 2013 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action in counterpart Japanese Patent Application No. 2018-509329 dated Apr. 20, 2021 (6 pages).
LG Electronics; "PUSCH transmission in LAA"; 3GPP TSG RAN WG1 meeting #84, R1-160625; St Julian's, Malta; Feb. 15-19, 2016 (5 pages).

* cited by examiner

| PRACH CONFIGURA-TION INDEX | PRE-AMBLE FORMAT | SYSTEM FRAME NUMBER | SUBFRAME NUMBER | PRACH CONFIGURA-TION INDEX | PRE-AMBLE FORMAT | SYSTEM FRAME NUMBER | SUBFRAME NUMBER |
|---|---|---|---|---|---|---|---|
| 0 | 0 | EVEN | 1 | 32 | 2 | EVEN | 1 |
| 1 | 0 | EVEN | 4 | 33 | 2 | EVEN | 4 |
| 2 | 0 | EVEN | 7 | 34 | 2 | EVEN | 7 |
| 3 | 0 | ANY | 1 | 35 | 2 | ANY | 1 |
| 4 | 0 | ANY | 4 | 36 | 2 | ANY | 4 |
| 5 | 0 | ANY | 7 | 37 | 2 | ANY | 7 |
| 6 | 0 | ANY | 1, 6 | 38 | 2 | ANY | 1, 6 |
| 7 | 0 | ANY | 2, 7 | 39 | 2 | ANY | 2, 7 |
| 8 | 0 | ANY | 3, 8 | 40 | 2 | ANY | 3, 8 |
| 9 | 0 | ANY | 1, 4, 7 | 41 | 2 | ANY | 1, 4, 7 |
| 10 | 0 | ANY | 2, 5, 8 | 42 | 2 | ANY | 2, 5, 8 |
| 11 | 0 | ANY | 3, 6, 9 | 43 | 2 | ANY | 3, 6, 9 |
| 12 | 0 | ANY | 0, 2, 4, 6, 8 | 44 | 2 | ANY | 0, 2, 4, 6, 8 |
| 13 | 0 | ANY | 1, 3, 5, 7, 9 | 45 | 2 | ANY | 1, 3, 5, 7, 9 |
| 14 | 0 | ANY | 0, 1, 2, 3, 4, 5, 6, 7, 8, 9 | 46 | N/A | N/A | N/A |
| 15 | 0 | EVEN | 9 | 47 | 2 | EVEN | 9 |
| 16 | 1 | EVEN | 1 | 48 | 3 | EVEN | 1 |
| 17 | 1 | EVEN | 4 | 49 | 3 | EVEN | 4 |
| 18 | 1 | EVEN | 7 | 50 | 3 | EVEN | 7 |
| 19 | 1 | ANY | 1 | 51 | 3 | Any | 1 |
| 20 | 1 | ANY | 4 | 52 | 3 | ANY | 4 |
| 21 | 1 | ANY | 7 | 53 | 3 | ANY | 7 |
| 22 | 1 | ANY | 1, 6 | 54 | 3 | ANY | 1, 6 |
| 23 | 1 | ANY | 2, 7 | 55 | 3 | ANY | 2, 7 |
| 24 | 1 | ANY | 3, 8 | 56 | 3 | ANY | 3, 8 |
| 25 | 1 | ANY | 1, 4, 7 | 57 | 3 | ANY | 1, 4, 7 |
| 26 | 1 | ANY | 2, 5, 8 | 58 | 3 | ANY | 2, 5, 8 |
| 27 | 1 | ANY | 3, 6, 9 | 59 | 3 | ANY | 3, 6, 9 |
| 28 | 1 | ANY | 0, 2, 4, 6, 8 | 60 | N/A | N/A | N/A |
| 29 | 1 | ANY | 1, 3, 5, 7, 9 | 61 | N/A | N/A | N/A |
| 30 | N/A | N/A | N/A | 62 | N/A | N/A | N/A |
| 31 | 1 | EVEN | 9 | 63 | 3 | EVEN | 9 |

FIG. 1

| PRACH CONFIGURA-TION INDEX | UL/DL CONFIGURATION | | | | | | |
|---|---|---|---|---|---|---|---|
| | 0 | 1 | 2 | 3 | 4 | 5 | 6 $(f_{RA}, t_{RA}^{(0)}, t_{RA}^{(1)}, t_{RA}^{(2)})$ |
| 0 | (0,1,0,2) | (0,1,0,1) | (0,1,0,0) | (0,1,0,2) | (0,1,0,1) | (0,1,0,0) | (0,1,0,2) |
| 1 | (0,2,0,2) | (0,2,0,1) | (0,2,0,0) | (0,2,0,2) | (0,2,0,1) | (0,2,0,0) | (0,2,0,2) |
| 2 | (0,1,1,2) | (0,1,1,1) | (0,1,1,0) | (0,1,0,1) | (0,1,0,0) | N/A | (0,1,1,1) |
| ... | ... | ... | ... | ... | ... | ... | ... |
| 18 | (0,0,0,0) | (0,0,0,0) | (0,0,0,0) | (0,0,0,0) | (0,0,0,0) | (0,0,0,0) | (0,0,0,0) |
| | (0,0,0,1) | (0,0,1,0) | (0,0,1,1) | (0,0,0,1) | (1,0,0,1) | (1,0,0,0) | (0,0,0,1) |
| | (0,0,0,2) | (1,0,1,0) | (1,0,0,0) | (0,0,0,2) | (1,0,0,1) | (2,0,0,0) | (0,0,1,0) |
| | (0,0,1,0) | (1,0,1,0) | (1,0,0,1) | (1,0,0,0) | (2,0,0,1) | (3,0,0,0) | (0,0,1,1) |
| | (0,0,1,1) | (2,0,0,1) | (2,0,0,0) | (1,0,0,1) | (2,0,0,1) | (4,0,0,0) | (1,0,0,0) |
| | (0,0,1,2) | (2,0,1,1) | (2,0,1,0) | (1,0,0,2) | (2,0,0,1) | (5,0,0,0) | (1,0,0,2) |
| ... | ... | ... | ... | ... | ... | ... | ... |
| 57 | (0,0,0,*) | (0,0,0,*) | (0,0,0,*) | (0,0,0,*) | (0,0,0,*) | (0,0,0,*) | (0,0,0,*) |
| | (1,0,0,*) | (1,0,1,*) | (1,0,0,*) | (1,0,0,*) | (1,0,0,*) | (1,0,0,*) | (1,0,1,*) |
| | (2,0,0,*) | (1,0,1,*) | (1,0,1,*) | (2,0,0,*) | (2,0,0,*) | (2,0,0,*) | (1,0,1,*) |
| | (2,0,1,*) | (2,0,0,*) | (2,0,0,*) | (3,0,0,*) | (3,0,0,*) | (3,0,0,*) | (2,0,0,*) |
| | (2,0,1,*) | (2,0,0,*) | (2,0,0,*) | (4,0,0,*) | (4,0,0,*) | (4,0,0,*) | (2,0,0,*) |
| | (2,0,1,*) | (2,0,1,*) | (2,0,1,*) | (5,0,0,*) | (5,0,0,*) | (5,0,0,*) | (2,0,1,*) |

FIG. 2

| PRACH MASK INDEX | ALLOWED PRACH (FDD) | ALLOWED PRACH (TDD) |
|---|---|---|
| 0 | All | All |
| 1 | PRACH RESOURCE INDEX 0 | PRACH RESOURCE INDEX 0 |
| 2 | PRACH RESOURCE INDEX 1 | PRACH RESOURCE INDEX 1 |
| 3 | PRACH RESOURCE INDEX 2 | PRACH RESOURCE INDEX 2 |
| 4 | PRACH RESOURCE INDEX 3 | PRACH RESOURCE INDEX 3 |
| 5 | PRACH RESOURCE INDEX 4 | PRACH RESOURCE INDEX 4 |
| 6 | PRACH RESOURCE INDEX 5 | PRACH RESOURCE INDEX 5 |
| 7 | PRACH RESOURCE INDEX 6 | RESERVED |
| 8 | PRACH RESOURCE INDEX 7 | RESERVED |
| 9 | PRACH RESOURCE INDEX 8 | RESERVED |
| 10 | PRACH RESOURCE INDEX 9 | RESERVED |
| 11 | EVERY, IN THE TIME DOMAIN, EVEN PRACH OPPORTUNITY 1st PRACH RESOURCE INDEX IN SUBFRAME | EVERY, IN THE TIME DOMAIN, EVEN PRACH OPPORTUNITY 1st PRACH RESOURCDE INDEX IN SUBFRAME |
| 12 | EVERY, IN THE TIME DOMAIN, ODD PRACH OPPORTUNITY 1st PRACH RESOURCE INDEX IN SUBFRAME | EVERY, IN THE TIME DOMAIN, ODD PRACH OPPORTUNITY |
| 13 | RESERVED | 1st PRACH RESOURCE INDEX IN SUBFRAME |
| 14 | RESERVED | 2nd PRACH RESOURCE INDEX IN SUBFRAME |
| 15 | RESERVED | 3rd PRACH RESOURCE INDEX IN SUBFRAME |

FIG. 3

| PRACH configuration index | Preamble format | $f_{RA}$ | PRACH configuration index | Preamble format | $f_{RA}$ | PRACH configuration index | Preamble format | $f_{RA}$ |
|---|---|---|---|---|---|---|---|---|
| 0 | 0 | (0)<br>(1)<br>(2)<br>(3)<br>(4)<br>(5)<br>(6)<br>(7)<br>(8)<br>(9) | 9 | 0 | (0,1,2,3,4,5,6,7,8,9) | ... | ... | ... |
| 1 | 0 | (0,9)<br>(2,7)<br>(4,5)<br>(6,3)<br>(8,1) | 10 | 4 | (0)<br>(1)<br>(2)<br>(3)<br>(4)<br>(5)<br>(6)<br>(7)<br>(8)<br>(9) | 20 | 4 | (0,1,2,3,4,5,6,7,8,9) |
| 2 | 0 | (0,2)<br>(4,6)<br>(8,9)<br>(7,5)<br>(3,1) | 11 | 4 | (0,9)<br>(2,7)<br>(4,5)<br>(6,3)<br>(8,1) | ... | ... | ... |
| ... | ... | ... | 12 | 4 | (0,2)<br>(4,6)<br>(8,9)<br>(7,5)<br>(3,1) | 63 | reserved | reserved |

FIG. 6

| PRACH MASK INDEX | ALLOWED PRACH (FS3) |
|---|---|
| 0 | ALL |
| 1 | PRACH RESOURCE INDEX 0 |
| 2 | PRACH PRACH RESOURCE INDEX 1 |
| 3 | PRACH PRACH RESOURCE INDEX 2 |
| 4 | PRACH PRACH RESOURCE INDEX 3 |
| 5 | PRACH PRACH RESOURCE INDEX 4 |
| 6 | PRACH PRACH RESOURCE INDEX 5 |
| 7 | PRACH PRACH RESOURCE INDEX 6 |
| 8 | PRACH PRACH RESOURCE INDEX 7 |
| 9 | PRACH PRACH RESOURCE INDEX 8 |
| 10 | PRACH PRACH RESOURCE INDEX 9 |
| 11 | RESERVED |
| 12 | RESERVED |
| 13 | RESERVED |
| 14 | RESERVED |
| 15 | RESERVED |

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12, etc.) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

The specifications of Rel. 8 to 12 LTE have been drafted assuming exclusive operation in frequency bands that are licensed to operators (also referred to as "licensed bands"). As licensed bands, for example, 800 MHz, 1.7 GHz and 2 GHz are used.

In recent years, user traffic has been increasing steeply following the spread of high-performance user terminals (UE: User Equipment) such as smart-phones and tablets. Although more frequency bands need to be added to accommodate this increasing user traffic, licensed bands have limited spectra (licensed spectra).

Consequently, a study is in progress with Rel. 13 LTE to enhance the frequencies of LTE systems by using bands of unlicensed spectra (also referred to as "unlicensed bands") that are available for use apart from licensed bands (see non-patent literature 2). For example, the 2.4 GHz band and the 5 GHz band, where Wi-Fi (registered trademark) and Bluetooth (registered trademark) can be used, are under study for use as unlicensed bands.

To be more specific, with Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). Note that, in the future, dual connectivity (DC) between licensed bands and unlicensed bands and stand-alone (SA) of unlicensed bands may become the subject of study under LAA.

For unlicensed bands in which LAA is run, a study is in progress to introduce interference control functionality in order to allow co-presence with other operators' LTE, Wi-Fi or different systems. In Wi-Fi, LBT (Listen Before Talk), which is based on CCA (Clear Channel Assessment), is used as an interference control function for use within the same frequency. LBT refers to the technique of "listening" (sensing) before transmitting signals, and controlling transmission based on the result of listening. For example, in Japan and Europe, the LBT function is stipulated as mandatory in systems that run in the 5 GHz unlicensed band such as Wi-Fi.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

Non-Patent Literature 2: AT&T, "Drivers, Benefits and Challenges for LTE in Unlicensed Spectrum," 3GPP TSG RAN Meeting #62 RP-131701

SUMMARY OF THE INVENTION

Technical Problem

Now, there are cases where, even in unlicensed band cells, it is necessary to perform random access (RA: Random Access) procedures in order to adjust uplink transmission timings. However, there is a problem that the resource configuration of the random access channel (PRACH: Physical Random Access Channel) in existing LTE systems cannot be applied to LAA on an as-is basis.

The present invention has been made in view of the above, and it is therefore an object of the present invention to provide a user terminal, a radio base station and a radio communication method, whereby random access procedures can be executed adequately in carriers where LBT is configured.

Solution to Problem

According to one aspect of the present invention, a user terminal has a control section that controls random access procedures for a carrier where listening is performed before uplink transmission, a receiving section that receives downlink control information including information about a period that is formed with a plurality of transmission time intervals (TTIs) in which a random access preamble can be transmitted, and a transmission section that transmits the random access preamble in the period, in the carrier, in response to receipt of the downlink control information.

Technical Advantage of the Invention

According to the present invention, random access procedures can be executed adequately in carriers where LBT is configured.

BRIEF DESCRIPTION OF THE DRAWINGS

FIG. 1 is a diagram to illustrate existing PRACH resource configurations used in FS 1;

FIG. 2 is a diagram to illustrate existing PRACH resource configurations used in FS 2;

FIG. 3 is a diagram to illustrate associations between PRACH resource indices and PRACH mask indices for FS 1 and FS 2;

FIG. 6 is a diagram to illustrate examples of PRACH resource configurations used in FS 3, according to a second embodiment of the present invention;

FIG. 7 is a diagram to illustrate examples of associations between PRACH resource indices and PRACH mask indices, according to the second embodiment;

DESCRIPTION OF EMBODIMENTS

Figure 4:
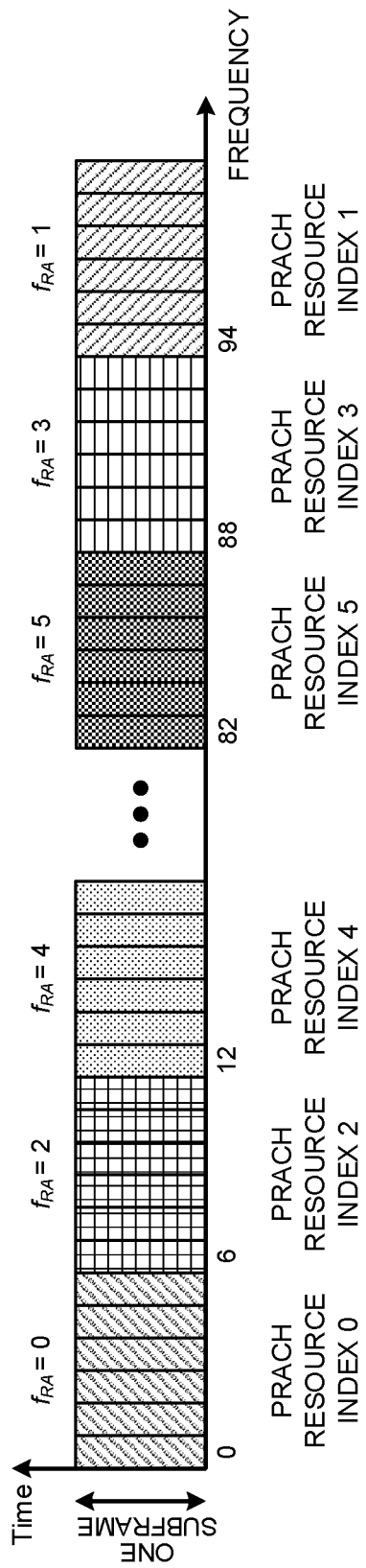
FIG. 4 is a diagram to illustrate examples of existing PRACH resources in the event FS 2 is used.

In systems that run LTE/LTE-A in unlicensed bands (for example, LAA systems), interference control functionality is likely to be necessary in order to allow co-presence with other operators' LTE, Wi-Fi and/or other systems. Note that systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier of an unlicensed band (which may also be referred to as an "unlicensed cell," an "unlicensed CC," etc.) detects another entity (for example, another UE) that is communicating in this unlicensed band carrier, the transmission point is disallowed to make transmission in this carrier.

In this case, the transmission point executes listening (LBT) at a timing that is a predetermined period ahead of transmission timing. To be more specific, by executing LBT, the transmission point searches the whole applicable carrier band (for example, one component carrier (CC)) at a timing that is a predetermined period ahead of a transmission timing, and checks whether or not other devices (for example, radio base stations, UEs, Wi-Fi devices and so on) are communicating in this carrier band.

Note that, in the present specification, "listening" refers to the operation which a given transmission point (for example, a radio base station, a user terminal, etc.) performs before transmitting signals, in order to check whether or not signals to exceed a predetermined level (for example, predetermined power) are being transmitted from other transmission points. Also, this "listening" performed by radio base stations and/or user terminals may be referred to as "LBT," "CCA," "carrier sensing" and so on.

Also, for example, LBT that is performed by an eNB prior to downlink transmission may be referred to as "DL LBT," and, for example, LBT that is performed by a UE prior to uplink transmission may be referred to as "UL-LBT." Information about the carrier where UL-LBT is to be carried out may be reported to the UE, and, based on this information, the UE may identify the carrier and execute UL-LBT.

The transmission point then carries out transmission using this carrier only if it is confirmed that no other apparatus is communicating. For example, if the received power measured by LBT (the received signal power during the LBT period) is equal to or lower than a predetermined threshold, the transmission point determines that the channel is in free state (LBT free) free and carries out transmission. When a "channel is in free state," this means that, in other words, the channel is not occupied by a specific system, and it is equally possible to say that a channel is "idle," a channel is "clear," a channel is "free," and so on.

On the other hand, if only just a portion of the target carrier band is detected to be used by another piece of apparatus, the transmission point stops its transmission. For example, if the transmission point detects that the received power of a signal from another piece of apparatus in this band exceeds a predetermined threshold, the transmission point determines the channel is in the busy state ($LBT_{busy}$), and makes no transmission. In the event $LBT_{busy}$ is yielded, LBT is carried out again with respect to this channel, and the channel becomes available for use only after the free state is confirmed. Note that the method of judging whether a channel is in the free state or in the busy state based on LBT is by no means limited to this.

As LBT mechanisms (schemes), FBE (Frame Based Equipment) and LBE (Load Based Equipment) are currently under study. Differences between these include the frame configurations to use for transmission/receipt, the channel-occupying time, and so on. In FBE, the LBT-related transmitting/receiving configurations have fixed timings. Also, in LBE, the LBT-related transmitting/receiving configurations are not fixed in the time direction, and LBT is carried out on an as-needed basis.

To be more specific, FBE has a fixed frame cycle, and is a mechanism of carrying out transmission if the result of executing carrier sensing for a certain period (which may be referred to as "LBT duration" and so on) in a predetermined frame indicates that a channel is available for use, and not making transmission but waiting until the next carrier sensing timing if no channel is available.

On the other hand, LBE refers to a mechanism for implementing the ECCA (Extended CCA) procedure of extending the duration of carrier sensing when the result of carrier sensing (initial CCA) indicates that no channel is available for use, and continuing executing carrier sensing until a channel is available. In LBE, random backoff is required to adequately avoid contention.

Note that the duration of carrier sensing (also referred to as the "carrier sensing period") refers to the time (for example, the duration of one symbol) it takes to gain one LBT result by performing listening and/or other processes and deciding whether or not a channel can be used.

A transmission point can transmit a predetermined signal (for example, a channel reservation signal) based on the result of LBT. Here, the result of LBT refers to information about the state of channel availability (for example, "LBT$_{free}$," "LBT$_{busy}$," etc.), which is acquired by LBT in carriers where LBT is configured.

Also, when a transmission point starts transmission based on an LBT result that indicates the free state (LBT$_{free}$), the transmission point can skip LBT and still carry out transmission, for a predetermined period (for example, for 10 to 13 ms). This transmission is also referred to as "burst transmission," "burst," "transmission burst," and so on.

As described above, by introducing interference control that is based on LBT mechanism and that is for use within the same frequency to transmission points in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Now, even in unlicensed band cells, it may be necessary to perform random access (RA) procedures in order to adjust uplink transmission timings. For example, when the distance between an eNB forming a secondary cell (SCell) of an unlicensed band and a UE is different from the distance between an eNB forming a primary cell (PCell) of a licensed band and the UE, the transmission timing for SCell is assumed to be different from the transmission timing for PCell Note that an SCell that operates in an unlicensed band may be referred to as an "LAA SCell," for example.

Note that the radio frame structures for use in LAA SCells are likely to be different from existing radio resource configurations because whether or not transmission is possible changes based on LBT. The radio frame used in FDD (Frequency Division Duplex) is referred to as "frame structure type 1 (FS 1)" and the radio frame used in TDD (Time Division Duplex) is referred to as "frame structure type 2 (FS 2)," and, in accordance with these, the radio frame structure used in LAA SCells is also referred to as "frame structure type 3 (FS 3)."

Now, research is in progress to introduce control based on non-contention-based random access (non-CBRA) in LAA SCells. Transmission control for the random access channel (PRACH: Physical Random Access Channel) in existing LTE systems will be described below.

FIG. 1 is a diagram to illustrate existing PRACH resource configurations used in FS 1. In relationship to FS 1, sixty four configurations are defined as illustrated in FIG. 1, and the UE identifies the "PRACH Configuration Index" in the drawing based on a configuration index (prach-ConfigIndex) that is reported in message 0 or higher layer signaling (for example, SIB 2 (System Information Block type 2), RRC (Radio Resource Control) signaling, etc.), and identifies the PRACH configuration consisting of the preamble format, the system frame number, the subframe number, and others.

Here, message 0 is reported via a downlink L1/L2 control channel (for example, PDCCH (Physical Downlink Control Channel) or EPDCCH (Enhanced PDCCH)), using downlink control information (DCI) in DCI format 1A. Note that message 0 may be referred to as a "PDCCH order," a "PRACH trigger," and so on.

The UE can transmit the PRACH (random access preamble) using time resources that are specified (for example, a system frame number, a subframe number, etc.). It then follows that which subframe in the time domain can be used for PRACH transmission is fixed in advance.

FIG. 2 is a diagram to illustrate existing PRACH resource configurations used in FS 2. For FS 2, the UE identifies information about the frequency resources ($f_{RA}$) for transmitting the PRACH and information about the time resources ($t_{RA}^{(0)}$, $t_{RA}^{(1)}$, $t_{RA}^{(2)}$) from the above-mentioned configuration index. In FS 2, the number and positions of uplink subframes vary depending on UL/DL configurations, and, as illustrated in FIG. 2, the above information of various resources is structured differently for each UL/DL configuration.

Also, when existing PRACH configurations are used, one PRACH is transmitted using six consecutive resource blocks (also referred to as "RBs," "PRBs (Physical RBs)," etc.) in the frequency domain. In the event FS 1 is used, the position where six consecutive PRBs, which are PRACH frequency resources, start is configured based on the frequency offset (prach-FrequencyOffset) reported in RRC signaling. In the event FS 2 is used, the position where six consecutive PRBs start is configured based on the frequency offset and the above-noted frequency resource information ($f_{RA}$).

Frequency resources that are used for PRACH transmission are specified based on the PRACH mask index (PRACH Mask Index, ra-PRACH-MaskIndex) that is reported in message 0 or RRC signaling.

FIG. 3 is a diagram to illustrate associations between PRACH resource indices and PRACH mask indices according to FS 1 and FS 2. As illustrated in FIG. 3, the associations between mask indices and frequency resources are defined in FS 1 (FDD) and FS 2 (TDD). In this manner, in non-contention-based random access, the eNB reports the PRACH resources to the UE by using a four-bit mask index.

FIG. 4 is a diagram to illustrate examples of existing PRACH resources in the case of FS 2. FIG. 4 illustrates an example of the case where 18 is set as the configuration index, 0 is set for the above-mentioned frequency offset, and 100 is set for the uplink transmission bandwidth (the number of RBs) in a UE using TDD of UL/DL configuration 5. Referring to FIG. 2, when the configuration index is 18, $f_{RA}$ is 0 to 5. Therefore, in this case, the UE can use six consecutive PRBs corresponding to one of $f_{RA}$=0 to 5 for PRACH transmission.

For example, a UE where the PRACH mask index "3" is reported performs PRACH transmission using the six PRBs corresponding to the PRACH resource index 2, in accordance with FIG. 3. In this way, when existing PRACH configurations are used, the PRACH can be transmitted using PRBs other than the center six PRBs (in particular, when FS 2 is used, frequency division multiplexing (FDM) by multiple UEs is possible), but the rule is to always use six consecutive PRBs.

In LAA, since DL transmission and UL transmission are performed based on LBT, it is preferable to design resource allocation flexibly. However, existing PRACH configurations cannot be designed flexibly because the UE is controlled to use fixed subframes specified for the PRACH.

In addition, the waveform of the PRACH in LAA SCells satisfies a predetermined requirement (bandwidth occupancy requirement) regarding the occupancy of bandwidth, which is set forth in Europe and elsewhere as a regulation targeting radio stations using the 5 GHz band, and research is in progress to ensure that its power spectral density (PSD) does not exceed a predetermined value (for example, 10 dBm/MHz). For example, the above predetermined requirement is that the transmission bandwidth of the PRACH is 80% or more of the usual channel bandwidth (nominal channel bandwidth) or system bandwidth.

However, since the existing PRACH uses only six consecutive PRBs as frequency resources, it is not possible to fulfill the above requirement for wideband transmission.

In this way, the PRACH resource configurations in existing LTE systems are not suitable for use in LAA, and so there is a problem that the random access procedures in LAA SCells cannot be appropriately implemented.

So the present inventors have come up with a PRACH resource configuration that is suitable for use in LAA SCells. To be more specific, the present inventors have come up with a structure that can flexibly adjust the relationship between the PDCCH order and the PRACH transmission timing in the time domain. Also, regarding the frequency domain, the present inventors have conceived of a structure, in which multiple resource configuration sets that occupy wide band are defined, and in which an index for specifying the frequency resources to be used in PRACH transmission among the plurality of sets is reported in the PDCCH order.

According to one aspect of the present invention, even if PRACH transmission fails due to the result of LBT in a given subframe, it is still possible to re-try in other candidate subframes. In addition, it is possible to realize PRACH transmission in a wide band that satisfies the above regulation (band to exceed six PRBs).

Now, embodiments of the present invention will be described in detail below with reference to the accompanying drawings. In each embodiment, a UE will be described to perform UL-LBT in LAA SCells, but this is not limiting.

Also, although the following embodiments will be described to employ CA where a licensed band carrier (which may be referred to as a "licensed cell," "licensed CC," etc.) serves as the PCell and an unlicensed cell serves as an SCell, this is by no means limiting.

That is, a structure, in which, in each embodiment, a licensed carrier is re-defined as a carrier where listening (LBT) is not configured (which may be also referred to as a "carrier where LBT is not executed," a "carrier where LBT cannot be executed," a "non-LBT carrier," etc.), and an unlicensed carrier is re-defined as a carrier where listening (LBT) is configured (which may be also referred to as a "carrier where LBT is executed," a "carrier where LBT should be executed," an "LBT carrier," etc.) also constitutes an embodiment of the present invention.

Also, the combinations of carriers where LBT is not configured and carriers where LBT is configured, as well as the combinations of PCell and SCells, are not limited to those given above. For example, the present invention can be applied to the case where a UE connects with an unlicensed band in stand-alone (when PCell and SCells are all carriers where LBT is configured), and so on.

(Radio Communication Method)

First Embodiment

A first embodiment of the present invention relates to a method of specifying the time fields of PRACH resources suitable for use in LAA SCells. According to the first embodiment, the eNB can flexibly configure the relationship between the PDCCH order and the timing of PRACH transmission in a UE.

Figure 5:
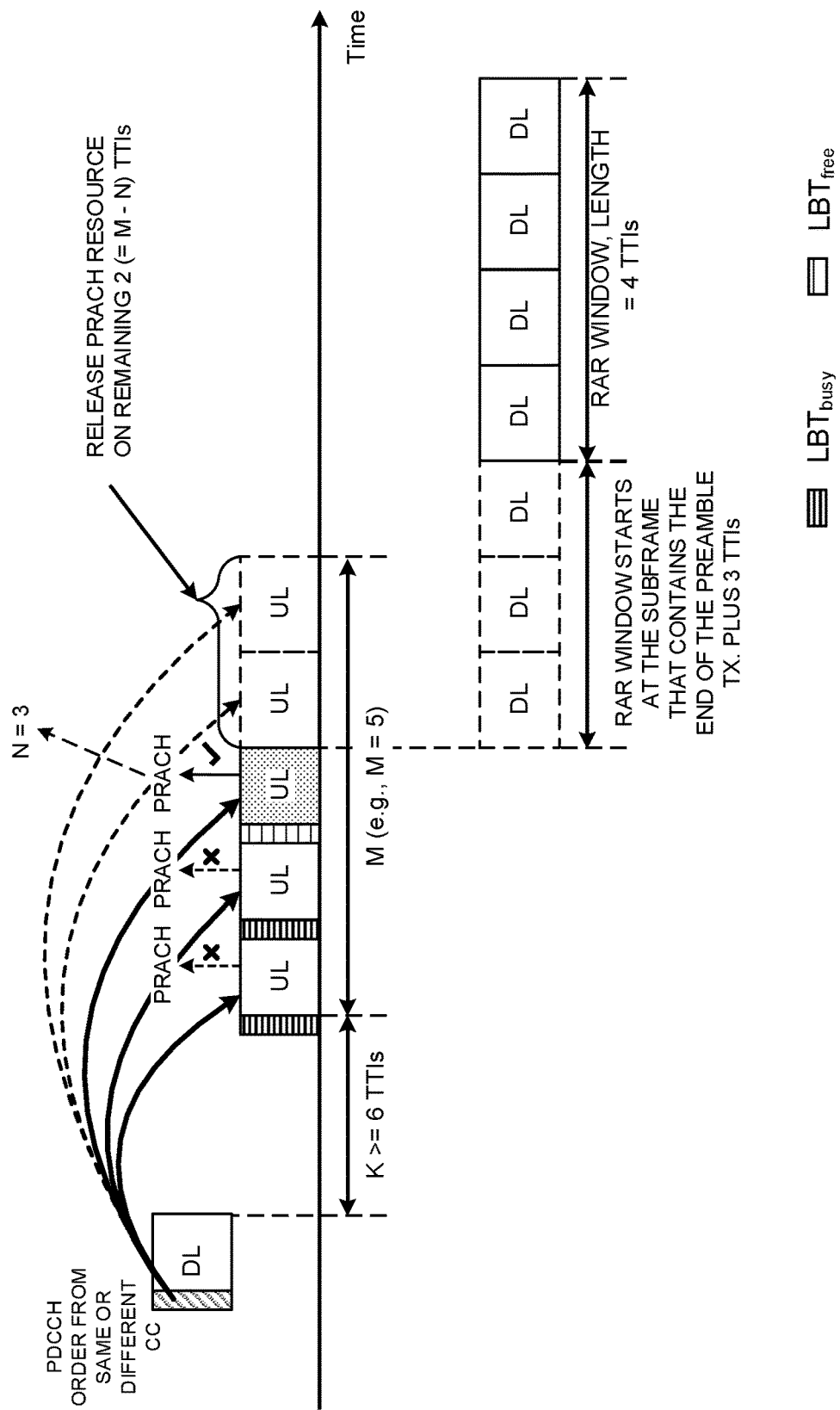
FIG. 5 is a diagram to illustrate an example of transmission/receiving processes in random access procedures, according to a first embodiment of the present invention.

The first embodiment will be described in detail with reference to FIG. 5. FIG. 5 is a diagram to illustrate examples of transmission/receiving processes in random access procedures according to the first embodiment.

In the first embodiment, one PDCCH order can specify a period that is formed with one or more (M) subframes (transmission time intervals (TTIs)) as candidates time resources for PRACH transmission. The UE may receive the PDCCH order in the same CC (LAA SCell) as the CC where the PRACH is transmitted, or receive it in another CC (either a licensed CC or an unlicensed CC).

Here, to provide information about the candidate time resources for PRACH transmission, information about M may be included and reported in the PDCCH order, or via RRC signaling. In the example of FIG. 5, M=5 is reported.

Also, as information about candidate time resources for PRACH transmission, bitmap information to indicate in which TTIs the PRACH can be transmitted may be reported. Information about the number of consecutive TTIs (subframes), "M," the cycle of allocating these consecutive subframes, the starting timing offset and so on may be reported as well.

Based on the reported information, the UE identifies one or more TTIs where PRACH transmission can be tried, and in each TTI, executes LBT, as needed, in order to carry out PRACH transmission.

The beginning of M consecutive subframes starts a predetermined period (for example, K TTIs after) after the subframe in which the PDCCH order is transmitted/received. Here, K is one of a number less than 6, a number less than or equal to 6, 6 and a number greater than or equal to 6. K may be defined in the specification in advance. Also, information (for example, information about K) about the predetermined period may be included in the PDCCH order and reported, or may be reported through higher layer signaling (for example, through RRC signaling).

Also, regarding the TTI duration, the present embodiment should preferably design a TTI (shortened TTI) that is shorter than the subframe duration in existing LTE. For example, the TTI duration may be 1 ms, or may be 1, 2, 3, 4 or 7 symbols, or may have a length other than these.

In addition, the period of symbols may be represented in, for example, OFDM (Orthogonal Frequency Division Multiplexing)/SC-FDMA (Single Carrier Frequency Division Multiple Access) symbol units, may be represented in reciprocal units of a predetermined bandwidth (that is, the sampling duration), or may be represented in other units.

The eNB reserves PRACH resources in M subframes, for the UE that has transmitted the PDCCH order, with respect to the subframe where the PRACH starts being transmitted. On the other hand, when, with respect to the subframe where the PRACH starts being transmitted, the eNB successfully receives the PRACH in the N-th (≤M) subframe, the eNB may release the PRACH resources in the remaining (M−N) subframes.

Referring to the example of FIG. 5, the UE fails to transmit the PRACH in the first and second subframes due to "$LBT_{busy}$," but succeeds in transmitting the PRACH in the third subframe. In this case, if the eNB detects the PRACH transmitted in the third subframe, N=3 can be applied. The eNB may release the PRACH resources in the remaining two subframes (=M−N).

Also, the UE may drop PRACH transmission if the UE fails the PRACH transmission in all of the M subframes specified. In this case, the UE must wait to transmit the PRACH until another PDCCH order is received.

After having transmitted the PRACH successfully, the UE attempts to receive the DCI for the RAR in response to that PRACH (DCI to use to specify the resources for receiving the RAR). Note that the RAR is received in a cell where a common search space is configured (for example, PCell), but the RAR may be received in a cell other than PCell.

The period to try receiving the DCI for the RAR (RAR receipt trying period) may be referred to as the "RAR window." For example, the RAR window is designed to have a duration of a predetermined number (RAR window size) of subframes, starting from a subframe three or more subframes after PRACH transmission is complete.

Although the RAR window size is "4" in the example illustrated in FIG. 5, it may be configured (reported) in the UE through higher layer signaling (for example, RRC signaling) and so on. Also, the period (for example, the number of subframes) from completion of PRACH transmission to the beginning of the RAR window is "3" in the example illustrated in FIG. 5, information about this period may be reported to the UE through higher layer signaling or the like.

In the present embodiment, the UE may use, as the PRACH format, at least one of the format to use the whole of a TTI as time resources (for example, PRACH format 0), and the format to use part of the symbols in a UL subframe as time resources (for example, PRACH format 4). Here, as part of the symbols in a subframe that are used in format 4, either the head part or the tail part of the subframe, or both of these, may be used. For example, these fragmentary symbols may include UL symbols (UpPTS: Uplink Pilot Time Slot) in a subframe where DL switches to UL, or may include the top two symbols in a UL subframe.

Note that format 0 and format 4 according to the present embodiment may be designed to be different from existing format 0 and format 4. For example, the cyclic prefix duration, the subcarrier spacing and the sequence length (the number of subcarriers) to be defined in these formats may have different valued than existing format 0 and format 4. Furthermore, PRACH formats other than format 0 and format 4 may be used.

Also, even if the PDCCH for RAR cannot be received in the RAR window, as long as candidate time resources for PRACH transmission are still present, the UE may retransmit the PRACH.

The PRACH is retransmitted with increased transmission power (power ramping). The transmission power of the PRACH is controlled in the MAC layer, and, to be more specific, calculated based on the number of times a preamble is transmitted (PREAMBLE_TRANSMISSION_COUNTER). The number of times the preamble is transmitted is incremented by 1 upon every retransmission. Note that when the PRACH cannot be transmitted because the result of LBT indicates "busy," the number of transmissions of the preamble needs not be incremented.

In the example of FIG. 5, for example, if M>10, the UE may retransmit the PRACH after the illustrated RAR window is over.

In addition, although, in existing LTE systems, the number of preamble transmissions is set (re-set) to 1 when the PDCCH order is received, regarding LAA SCell, a provision may be provided for not resetting the number of preamble transmissions. For example, if the previous (most recent) PRACH transmission ended in failure, the UE may be commanded to continue counting the number of times the preamble is transmitted from the previous preamble transmission count (for example, the previous preamble transmission count+1 is commanded to the UE). For example, information about the control of the number of preamble transmissions may be included in the PDCCH order and reported (command) to the UE. Furthermore, the UE may be specified in the specification to perform the above-described control in LAA SCells. In this case, the chance of success of PRACH transmission can be improved even in LAA SCells.

According to the first aspect described above, it is possible to configure, in a UE, a period that is formed with a plurality of consecutive TTIs where the PRACH can be transmitted, so that LBT can be attempted in this period, and the PRACH can be transmitted in a short time.

Second Embodiment

A second embodiment of the present invention relates to a method of specifying the frequency fields of PRACH resources suitable for use in LAA SCells. According to the second embodiment, multiple resource configuration sets to occupy a wide band (for example, a band wider than the six PRBs), are defined, and the eNB reports an index to indicate at least one of the resource configuration sets (resource pattern) to the UE by using the PDCCH order.

In the second embodiment, the frequency band in which the PRACH is allocated needs not be a continuous frequency band. That is, the UE can perform multi-cluster transmission for the PRACH on RB levels.

This multi-cluster transmission is performed using sets of frequency resources (PRB sets) that are allocated at predetermined frequency intervals (for example, at 10-PRB intervals). These resource sets may be referred to as "interlaces."

In the following description, the system bandwidth will be 100 PRBs, and the interlaces will each be a set of ten PRBs, distributed and arranged at 10-PRB intervals in the system bandwidth, but the structures of the system bandwidth and the interlaces are not limited to these.

For example, the structure of interlaces (for example, the frequency interval of PRBs used, the number of PRBs used, etc.) may be changed based on the system bandwidth, the UE's transmission power, the maximum possible transmission power, the number of UEs that can communicate with the radio base station, and so on. Also, the structure of interlaces is the same as those used in other channels such as the PUSCH, or may be a different structure (individual structure). In addition, an interlace does not necessarily have to be a set consisting only of discontinuous PRBs, and may be a set including consecutive PRBs.

Also, information about the structure of interlaces may be configured (reported) in the UE by higher layer signaling (for example, RRC signaling, broadcast information (the MIB (Master Information Block), SIBs (System Information Block), etc.), physical layer signaling (for example, DCI), other signals or a combination of these.

According to the second embodiment, sets of frequency resource indices, where the PRACH can be assigned, are associated with configuration indices (prach-ConfigIndex) that are reported in, for example, the PDCCH order, RRC signaling and so on, and these sets of frequency resource indices are formed in interlace units.

FIG. 6 is a diagram to illustrate examples of PRACH resource configurations used in FS 3, according to the second embodiment. For FS 3, the UE looks up the table illustrated in FIG. 6, and, based on the configuration index, specifies the preamble format and the set of frequency resource indices where the PRACH can be allocated.

In FIG. 6, for example, when the configuration index (PRACH configuration index) is 0, ten orthogonal resources can be prepared (maximum ten UEs can be multiplexed). When the configuration index is 9, all RBs are used for PRACH transmission (only one UE can transmit). Each orthogonal resource may be defined in a one-to-one correspondence with the PRACH resource index.

If multiple frequency resource configurations can be used within one PRACH configuration, as in the case of configuration index=0, which specific resource configurations are used may be specified by mask indices (PRACH Mask Index) that are included in the PDCCH order or mask indices (ra-PRACH-MaskIndex) that are reported in RRC signaling.

Note that the UE may ignore the mask index when only one frequency resource configuration can be used in one PRACH configuration, as in the case of configuration index=9. Also, the UE may specify the frequency resource configuration to use (for example, a set of frequency resource indices) based on information other than the mask index.

FIG. 7 is a diagram to illustrate examples of association between PRACH resource indices and PRACH mask indices according to the second embodiment. As illustrated in FIG. 6, in this example, the number of PRACH resource configuration patterns is maximum ten, which is the case when, for example, the configuration index is 0, so that it is only necessary to designate ten PRACH resource indices, from 0 to 9.

As illustrated in FIG. 6 and FIG. 7, the associations between a predetermined index and other pieces of information may be set forth in the specification in advance, or may be configured through higher layer signaling.

The UE specifies the set of frequency resource indices $\tilde{f}_{RA}$ where the PRACH can be allocated, based on the configuration index, the mask index and so on. The frequency domain PRACH resource pattern can be determined by, for example, placing each $\tilde{f}_{RA}$ included in this set in following equation 1:

$$n_{PRB,i}^{RA} = \begin{cases} \left\lfloor \frac{\tilde{f}_{RA}}{2} \right\rfloor + 10i, & \text{if } \tilde{f}_{RA} \bmod 2 = 0 \\ N_{RB}^{UL} - 1 - \left\lfloor \frac{\tilde{f}_{RA}}{2} \right\rfloor - 10i, & \text{otherwise} \end{cases} \quad \text{(Equation 1)}$$

where $N_{RB}^{UL}$ is the number of PRBs in the system bandwidth, and i=0, 1, . . . 9.

Note that equation 1 is an equation for determining resource patterns in the event the system bandwidth is 100 PRBs and the interlaces are sets of ten PRBs, distributed and arranged at 10-PRB intervals in the system bandwidth. If the structures of the system bandwidth and/or interlaces do not match these conditions, the UE can identify the resource pattern using equations that are modified as appropriate (for example, by using an equation in which "10" in equation 1 is replaced by the interval of PRBs in interlaces).

Figure 8:
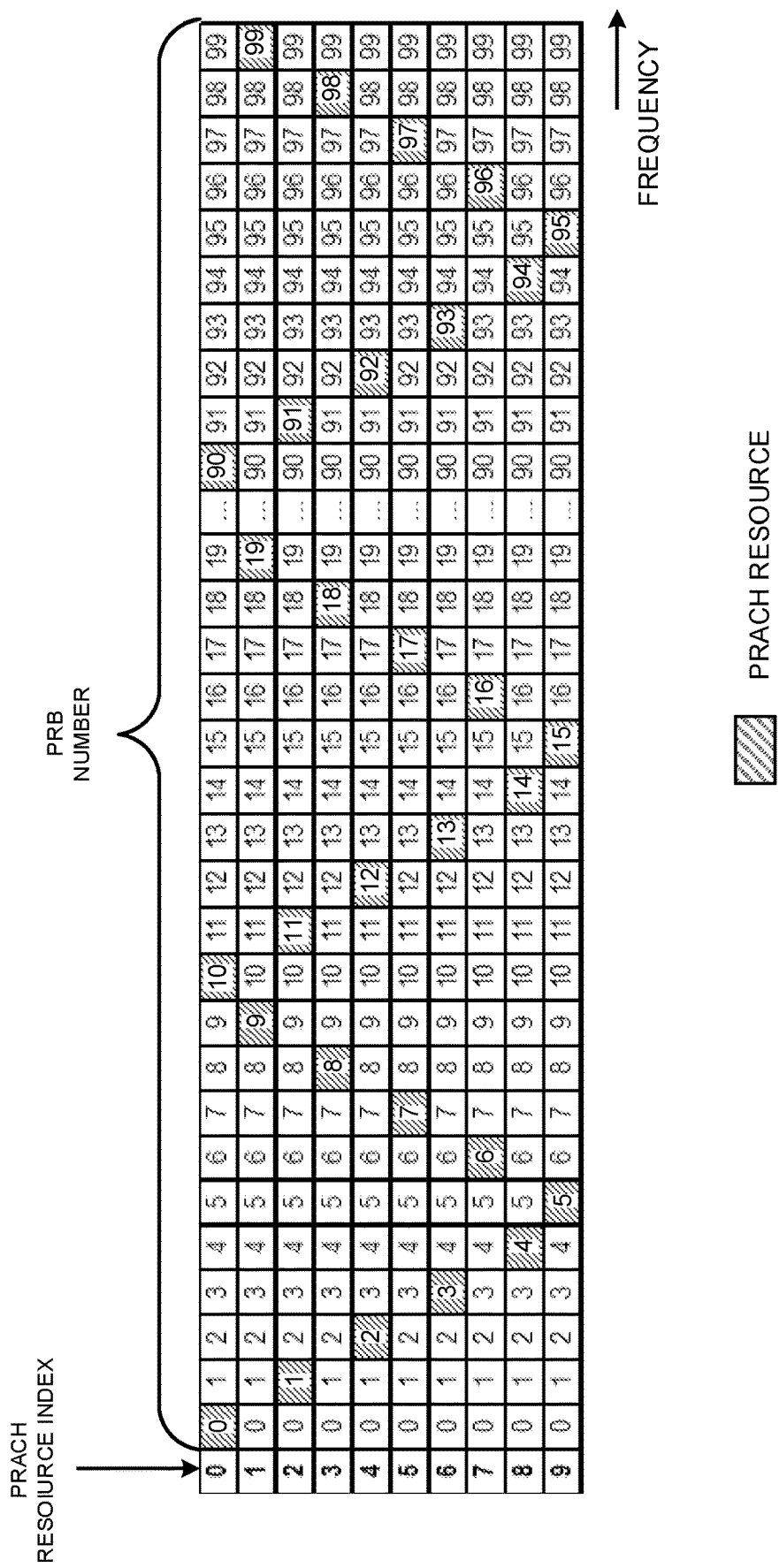
FIG. 8 is a diagram to illustrate an example of each frequency resource pattern corresponding to the configuration index=0 in the PRACH resource configurations of FIG. 6.
Figure 9:
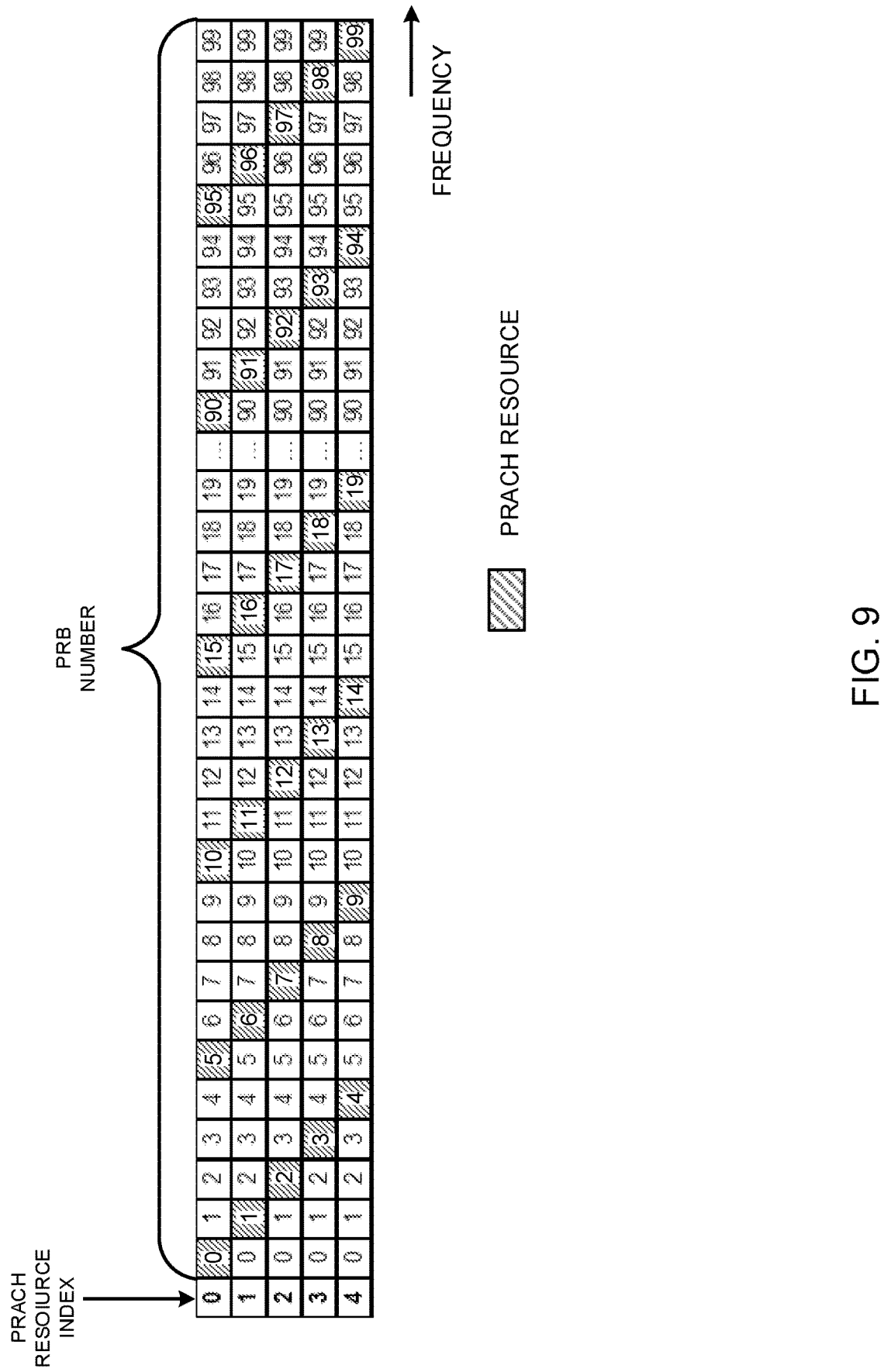
FIG. 9 is a diagram to illustrate an example of each frequency resource pattern corresponding to the configuration index=1 in the PRACH resource configurations of FIG. 6.
Figure 10:
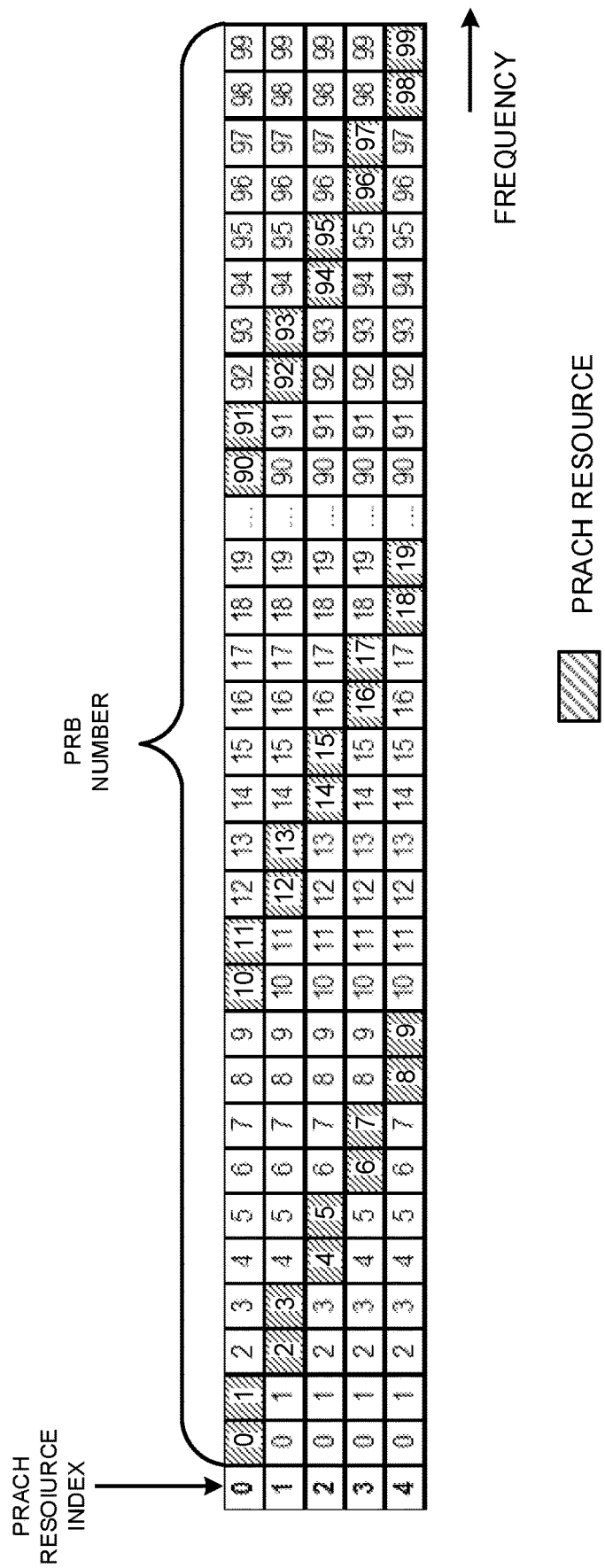
FIG. 10 is a diagram to illustrate an example of each frequency resource pattern corresponding to the configuration index=2 in the PRACH resource configurations of FIG. 6.

Specific examples of determining PRACH resource patterns in the frequency domain according to the second embodiment will be described below with reference to the drawings. FIGS. 8 to 10 are diagrams, in which each row indicates a resource pattern (RA preamble mapping pattern) for each PRACH resource index (here, the same value as the mask index).

FIG. 8 is a diagram to illustrate examples of each frequency resource pattern corresponding to the configuration index=0 in the PRACH resource configurations of FIG. 6. Referring to the example of FIG. 8, in each configuration, transmission is performed using one PRB every ten PRBs, thereby using ten PRBs in total.

FIG. 9 is a diagram to illustrate examples of each frequency resource pattern corresponding to the configuration index=1 in the PRACH resource configurations of FIG. 6. Referring to the example of FIG. 9, in each configuration, transmission is performed using one PRB every five PRBs, thereby using twenty PRBs in total. This example is equivalent to a case where the number of non-adjacent (discontinuous) interlaces is two.

FIG. 10 is a diagram to illustrate examples of each frequency resource pattern corresponding to the configuration index=2 in the PRACH resource configurations of FIG. 6. Referring to the example of FIG. 10, in each configuration, transmission is performed using two PRBs every ten PRBs, thereby using a total of twenty PRBs. This example indicates a case where the number of adjacent (continuous) interlaces is two.

In this manner, the PRACH resource pattern according to the second embodiment is formed with one or more frequency resource sets among a plurality of frequency resource sets (that is, frequency resources included in a given frequency resource set do not overlap frequency resources included in another frequency resource set) orthogonal to each other.

According to the second aspect described above, it is possible to realize PRACH transmission in a wide band (by using a wider range of frequency resources than six PRBs) satisfying the above-mentioned regulation for LAA SCells, and realize FDM for transmission of a plurality of PRACHs.

(Radio Communication System)

Now, the structure of the radio communication system according to one embodiment of the present invention will be described below. In this radio communication system, the radio communication method according to one and/or a combination of the above-described embodiments of the present invention is employed.

Figure 11:
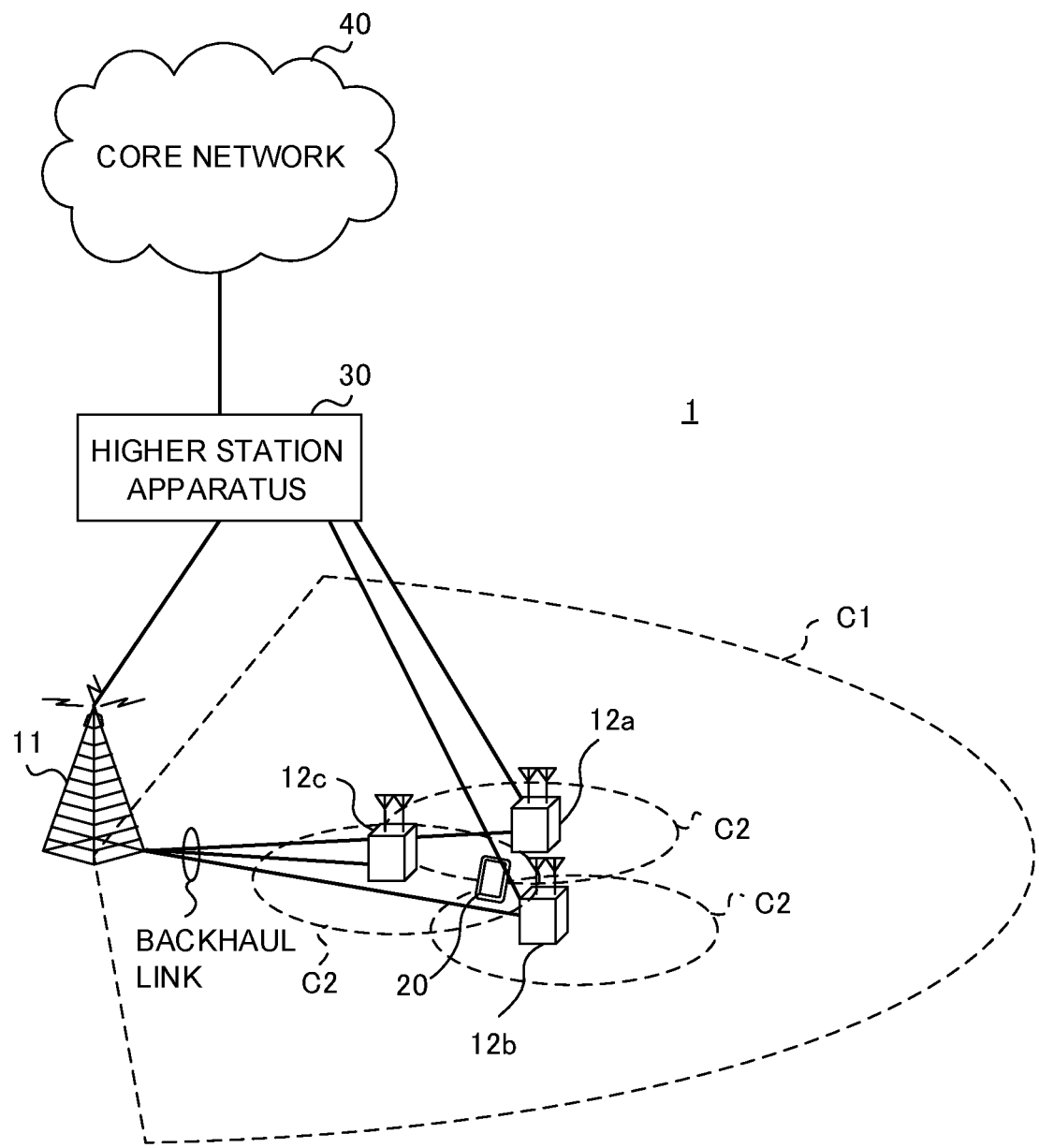
FIG. 11 is a diagram to illustrate an example of a schematic structure of a radio communication system according to one embodiment of the present invention.

FIG. 11 is a diagram to illustrate an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth constitutes 1 unit. Also, the radio communication system 1 has a radio base station (for example, an LTE-U base station) that is capable of using unlicensed bands.

Note that the radio communication system 1 may be referred to as "SUPER 3G," "LTE-A" (LTE-Advanced), "IMT-Advanced," "4G" (4th generation mobile communication system), "5G" (5th generation mobile communication system), "FRA" (Future Radio Access) and so on.

The radio communication system 1 illustrated in FIG. 11 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 that uses a licensed band to the user terminals 20. Furthermore, a structure may be employed here in which, when CA is applied between a licensed band and an unlicensed band, 1 radio base station (for example, the radio base station 11) controls the scheduling of licensed band cells and unlicensed band cells.

Note that it is equally possible to adopt a structure in which a user terminal 20 connects with the radio base stations 12, without connecting with the radio base station 11. For example, it is possible to adopt a structure in which a radio base station 12 that uses an unlicensed band establishes a stand-alone connection with a user terminal 20. In this case, the radio base station 12 controls the scheduling of unlicensed band cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise. Also, it is preferable to configure radio base stations 10 that use the same unlicensed band on a shared basis to be synchronized in time.

The user terminals 20 are terminals that support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACK/NACK) in response to the PUSCH are communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an "uplink data channel." User data and higher layer control information are communicated by the PUSCH. Also, downlink radio quality information (CQI: Channel Quality Indicator), delivery acknowledgment information (ACK/NACK) and so on are communicated by the PUCCH. By means of the PRACH, random access preambles for establishing connections with cells are communicated.

In the radio communication systems 1, cell-specific reference signals (CRSs), channel state information reference signals (CSI-RSs), demodulation reference signal (DMRSs) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 12:
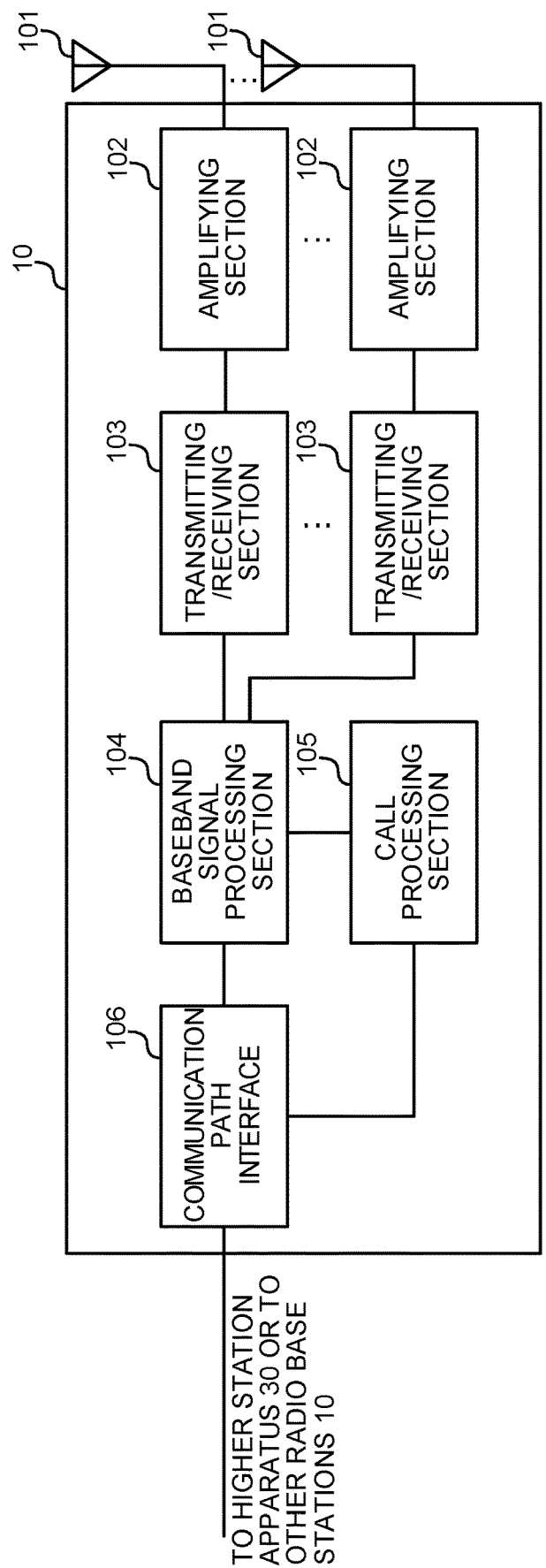
FIG. 12 is a diagram to illustrate an example of an overall structure of a radio base station according to one embodiment of the present invention.

FIG. 12 is a diagram to illustrate an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 are capable of transmitting/receiving UL/DL signals in unlicensed bands. Note that the transmitting/receiving sections 103 may be capable of transmitting/receiving UL/DL signals in licensed bands as well. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit a PDCCH order and a RAR to the user terminal 20 in a licensed CC and/or an unlicensed CC. In addition, the transmitting/receiving sections 103 can receive the PUSCH from the user terminal 20 at least in an unlicensed CC.

Figure 13:
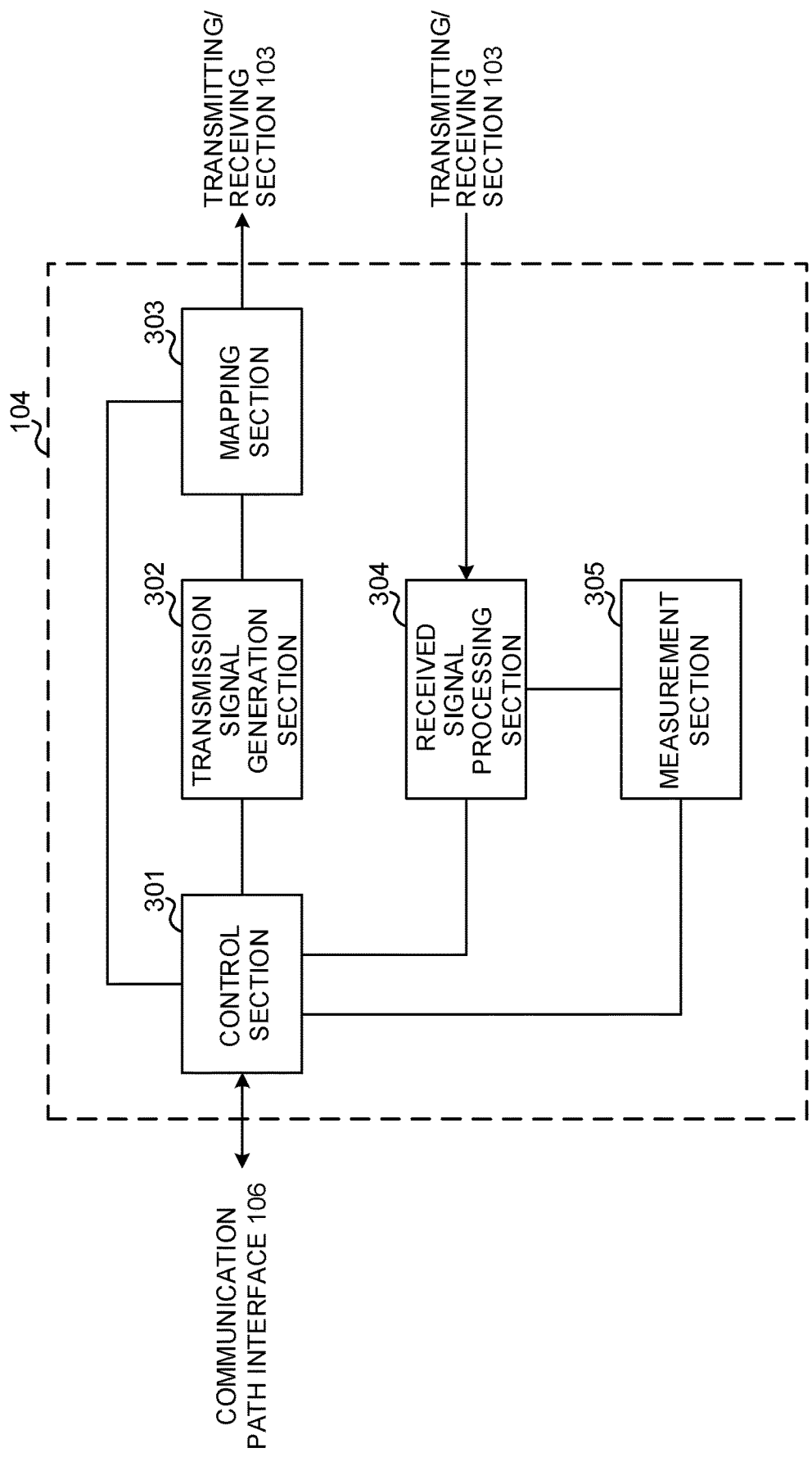
FIG. 13 is a diagram to illustrate an example of a functional structure of a radio base station according to one embodiment of the present invention.

FIG. 13 is a diagram to illustrate an example of a functional structure of a radio base station according to one embodiment of the present invention. Note that, although FIG. 10 primarily illustrates functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. Note that, when a licensed band and an unlicensed band are scheduled with 1 control section (scheduler) 301, the control section 301 controls communication in licensed band cells and unlicensed band cells. For the control section 301, a controller, a control circuit or control apparatus that can be described based on common understanding of the technical field to which the present invention pertains can be used.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 may control the transmission signal generation section 302 and the mapping section 303 to transmit downlink signals (for example, PDCCH/EPDCCH) in carriers (for example, unlicensed CCs) where listening is performed before downlink transmission according to the LBT result obtained in the measurement section 305.

The control section 301 also controls the random access procedures for carriers where listening is performed before uplink transmission. The control section 301 controls the PRACH resources (time resources and/or frequency resources) used by the user terminal 20.

In addition, the control section 301 exerts control so that a PDCCH order including information about a period consisting of one or more TTIs is generated and transmitted to the user terminal 20. Based on this information, the control section 301 exerts control so that the PRACH transmitted from the user terminal 20 is received in this period.

The control section 301 may exert control so that the time resources for PRACH transmission and/or information related to the time resources are reported using downlink control information (for example, an PDCCH order) and/or through higher layer signaling. The control section 301 may exert control so that, for example, information about above-described "M," information about "K," information about the interlace structure, the configuration index, the mask index and so on are reported in the PDCCH order and/or reported through higher layer signaling.

When the PRACH from the user terminal 20 is successfully received in a predetermined TTI (subframe) in the above period, the control section 301 controls the remaining TTIs in this period so that that the PRACH resources allocated (reserved) to the user terminal 20 are released. Also, the control section 301 may exert control so that an RAR is transmitted in response to the PRACH received.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 executes LBT in a carrier where LBT is configured (for example, an unlicensed band) based on commands from the control section 301, and outputs the results of LBT (for example, judgments as to whether the channel state is free or busy) to the control section 301.

Also, the measurement section 305 may measure, for example, the received power (for example, RSRP (Reference Signal Received Power)), the received signal strength (for example, RSSI (Received Signal Strength Indicator)), the received quality (for example, RSRQ (Reference Signal Received Quality)) and the channel states of the received signals. The measurement results may be output to the control section 301.

(User Terminal)

Figure 14:
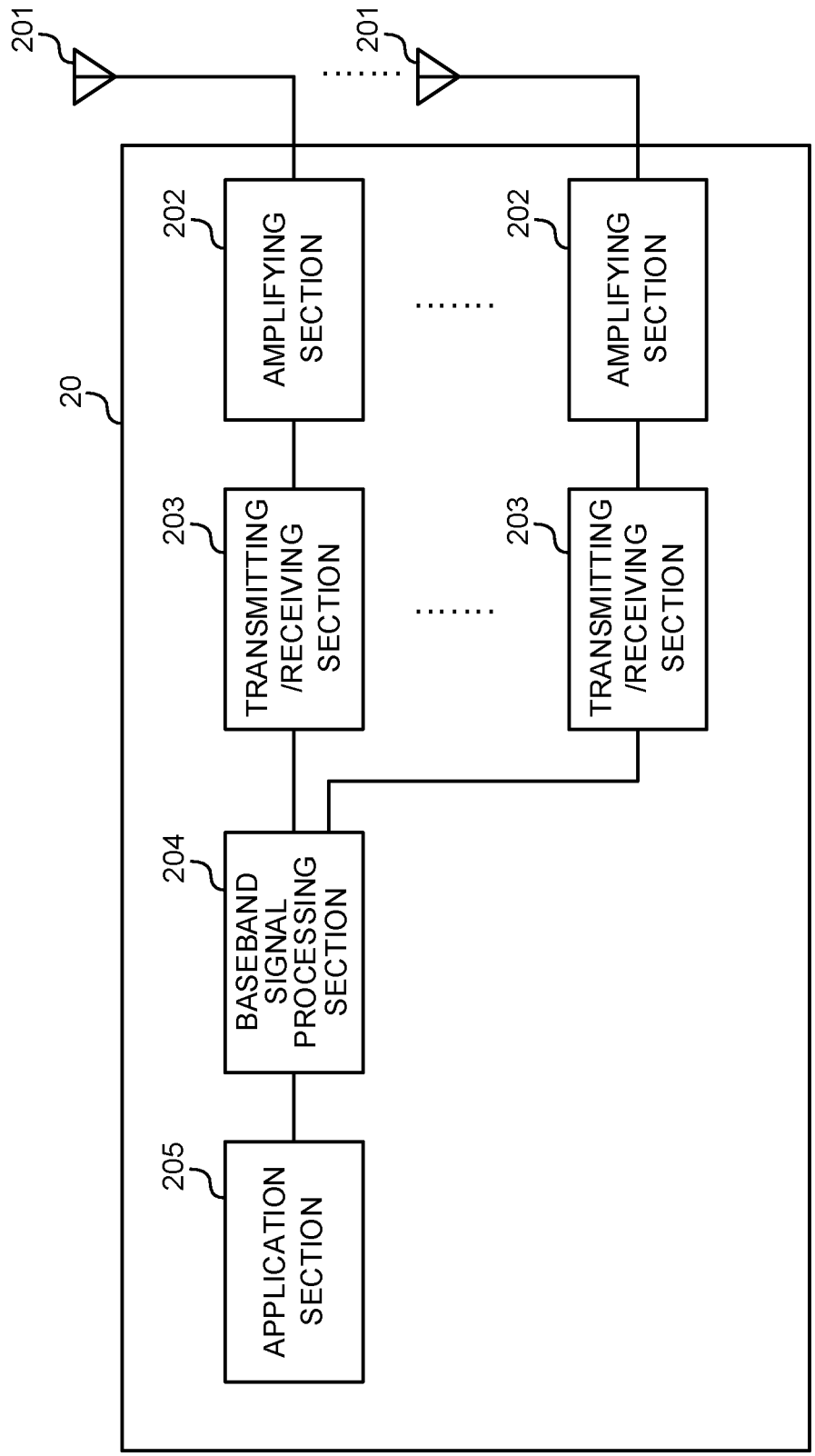
FIG. 14 is a diagram to illustrate an example of an overall structure of a user terminal according to one embodiment of the present invention.

FIG. 14 is a diagram to illustrate an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 are capable of transmitting/receiving UL/DL signals in unlicensed bands. Note that the transmitting/receiving sections 203 may be capable of transmitting/receiving UL/DL signals in licensed bands as well.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive a PDCCH order and a RAR from the radio base station 10 in a licensed CC and/or an unlicensed CC. In addition, the transmitting/receiving sections 203 transmit the PRACH to the radio base station 10 at least in an unlicensed CC.

Figure 15:
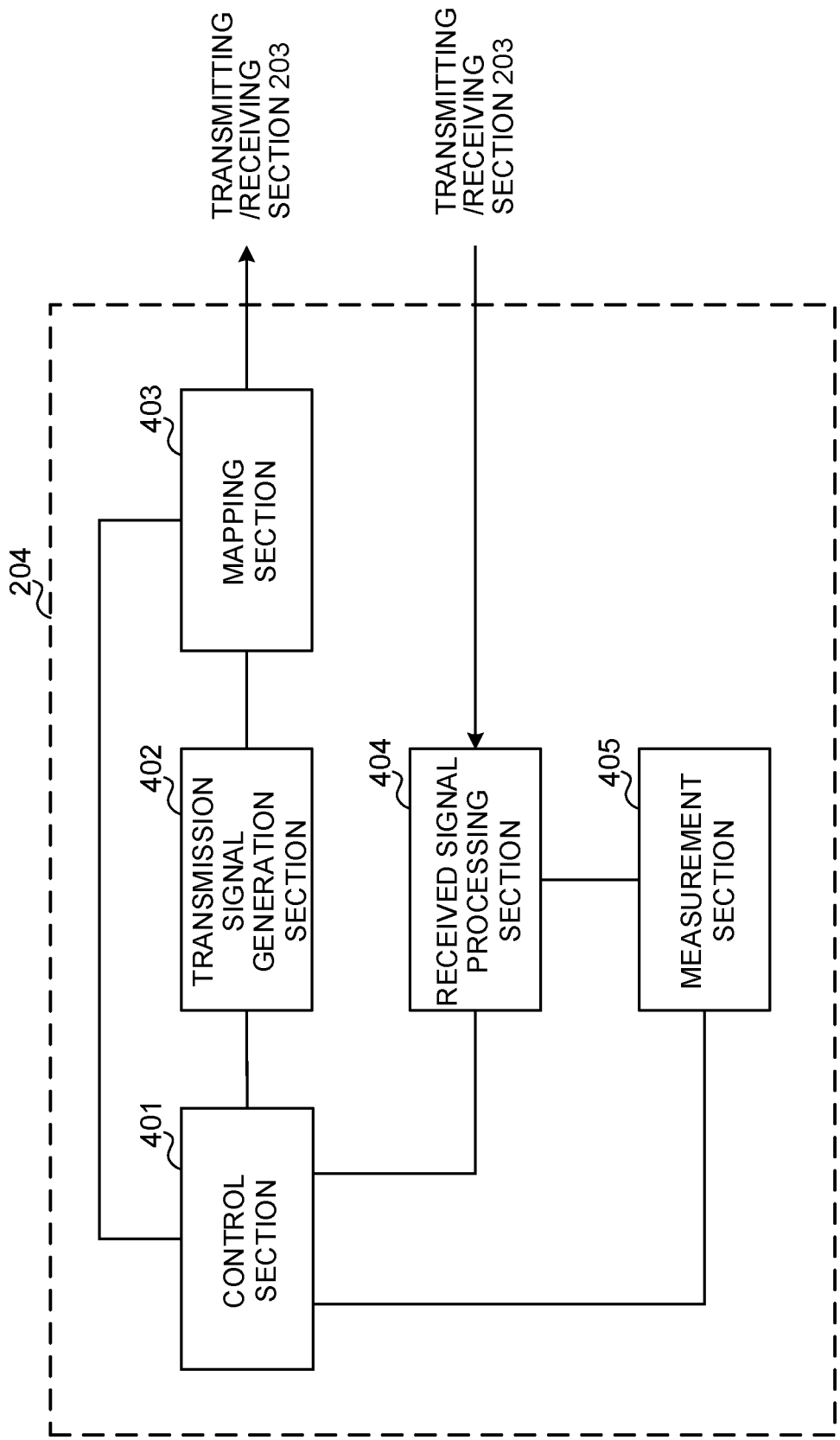
FIG. 15 is a diagram to illustrate an example of a functional structure of a user terminal according to one embodiment of the present invention.

FIG. 15 is a diagram to illustrate an example of a functional structure of a user terminal according to one embodiment of the present invention. Note that, although FIG. 15 primarily illustrates functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

The control section 401 may control the transmission signal generation section 402 and the mapping section 403 to transmit uplink signals (for example, the PRACH) in carriers (for example, unlicensed CCs) where listening is performed before uplink transmission, according to LBT results obtained in the measurement section 405.

The control section 401 also controls the random access procedures for carriers where listening is performed before uplink transmission. The control section 401 obtains information which relates to a period consisting of one or more TTIs, and which is included in the PDCCH order, from the received signal processing section 404, and, based on this information, the control section 401 exerts control so that candidate time resource candidates where the PRACH may be transmitted are identified. Furthermore, upon receipt of the above PDCCH order, the control section 401 controls the execution of listening and the transmission of the PRACH (random access preamble) transmission, on the assumption that the above time resource candidates start after a predetermined period of time.

The control section 401 may exert control so that the transmitting/receiving sections 203 transmit the PRACH using one whole TTI (PRACH format 0) or transmit the PRACH using only part of the symbols in a TTI (PRACH format 4).

The control section 401 can identify a wider range of frequency resources than the six PRBs for transmitting the PRACH, based on a configuration index that is reported in a PDCCH order or through higher layer signaling (for example, RRC signaling). Also, the control section 401 may determine the number of frequency resource sets (interlaces) formed with a wider range of frequency resources than the six PRBs, based on the configuration index.

In addition, the control section 401 may identify a set of frequency resource indices where the PRACH can be transmitted, based on the configuration index, the mask index and so on, and identify the PRACH resource pattern in the frequency domain.

Also, the control section 401 can control the transmission power/retransmission power of the PRACH. These powers may be determined based on the number of times the preamble is transmitted.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generating section 402 generates uplink control signals such as delivery acknowledgement signals (HARQ-ACKs), channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 executes LBT in carriers where LBT is configured, based on commands from the control section 401. The measurement section 405 may output the results of LBT (for example, judgments as to whether the channel state is free or busy) to the control section 401.

Also, the measurement section 405 may measure the received power (for example, RSRP), the received signal strength (RSSI), the received quality (for example, RSRQ) and the channel states and so on of the received signals. The measurement results may be output to the control section 401.

(Hardware Structure)

Note that the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 16:
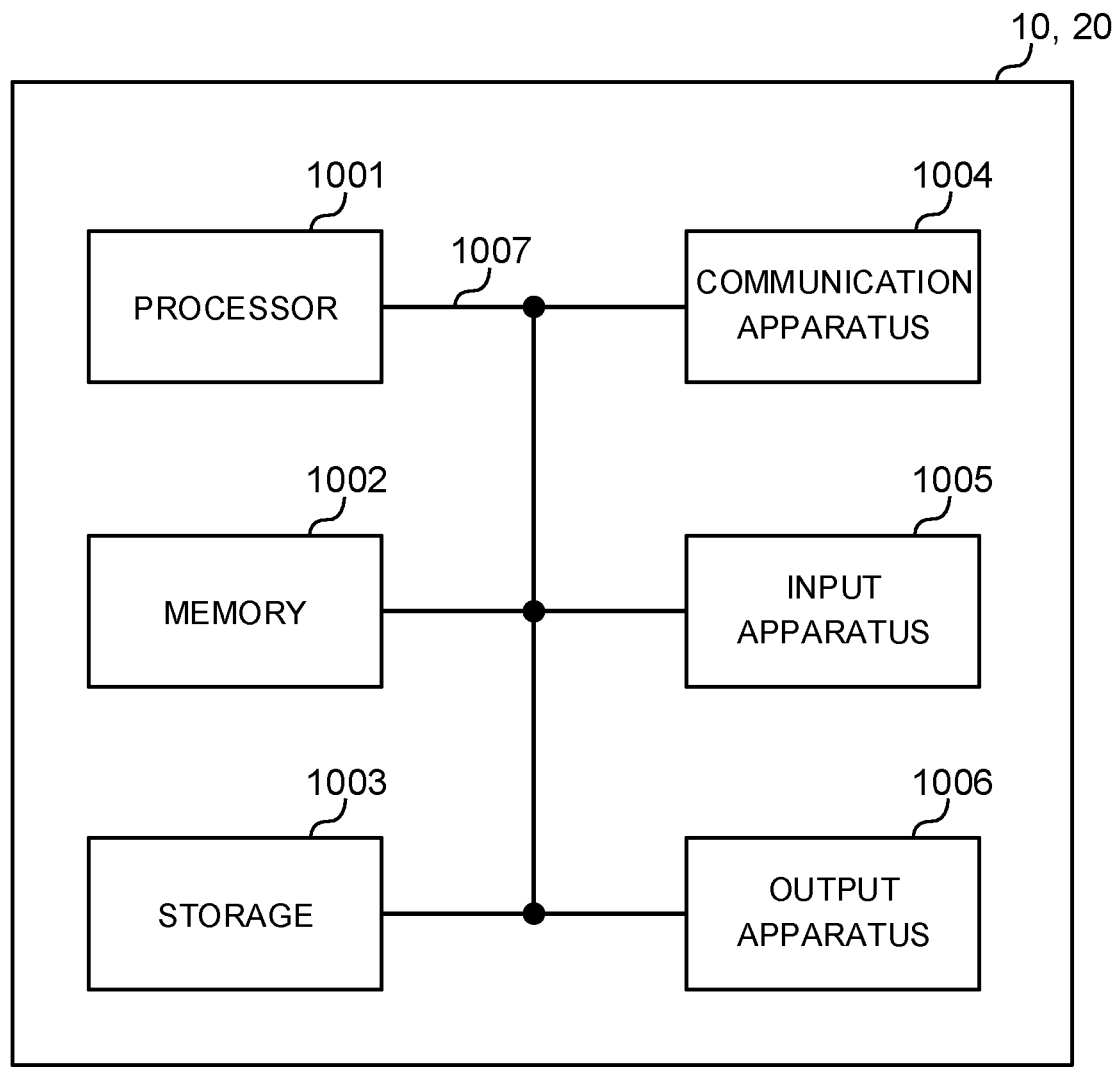
FIG. 16 is a diagram to illustrate an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 16 is a diagram to illustrate an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented in sequence, or in different manners, on one or more processors.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, predetermined information (for example, reporting of information to the effect that "X holds") does not necessarily have to be reported explicitly, and can be reported in an implicit manner (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

As used herein the terms "determining" and "determining" encompass a wide variety of actions. For example, to "decide" and "determine" as used herein may be interpreted to mean making decisions and determinations related to calculating, computing, processing, deriving, investigating, looking up (for example, searching a table, a database or some other data structure), ascertaining and so on. Furthermore, to "decide" and "determine" as used herein may be interpreted to mean making decisions and determinations related to receiving (for example, receiving information), transmitting (for example, transmitting information), inputting, outputting, accessing (for example, accessing data in a memory) and so on. In addition, to "decide" and "determine" as used herein may be interpreted to mean making decisions and determinations related to resolving, selecting, choosing, establishing, comparing and so on.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

This disclosure of Japanese Patent Application No. 2016-071679, filed on Mar. 31, 2016, including the specification, drawings and abstract, is incorporated herein by reference in its entirety.

The invention claimed is:

1. A terminal comprising:
   a transmitter that transmits a physical random access channel (PRACH); and
   a controller that controls the transmission of the PRACH, based on a condition, by using at least one of a scheduling of a plurality of PRACH transmission occasions in a time direction and a configuring of a plurality of PRACH transmission resources in a frequency direction, wherein the condition indicates that a received information specifies at least one occasion of the plurality of PRACH transmission occasions, wherein in a case where Listen Before Talk (LBT) indicates that one of the plurality of PRACH transmission occasions fails due to the result of LBT in a time unit, another one of the plurality of PRACH transmission occasions is used for PRACH transmission, and wherein the PRACH transmission occurs if a received signal power measured during the time unit is equal to or lower than a predetermined threshold.

2. The terminal according to claim 1, further comprising a receiver that receives the at least one of the scheduling and the configuration, wherein the controller assumes that the transmission of the PRACH starts a predetermined period after a period in which the at least one of the scheduling and the configuration is received.

3. The terminal according to claim 1, wherein the controller identifies a wider range of frequency resources greater than six resource blocks for transmitting the PRACH, based on a configuration index that is reported in a downlink control information or higher layer signaling.

4. The terminal according to claim 3, wherein
the wider range of frequency resources is formed with one or more frequency resource sets among a plurality of frequency resource sets that are orthogonal to each other, and
the controller determines the number of frequency resource sets that form the wider range of frequency resources based on the configuration index.

5. The terminal according to claim 1, wherein the condition indicates that a received information specifies at least one resource of the plurality of PRACH transmission resources.

6. The terminal according to claim 5, wherein the information is signaled implicitly or explicitly.

7. A radio base station comprising:
a transmitter that transmits, to a terminal, a downlink control information (DCI) including information regarding at least one of a scheduling of a plurality of PRACH transmission occasions in a time direction and a configuring of a plurality of PRACH transmission resources in a frequency direction; and
a controller that controls the reception of a PRACH, based on a condition, transmitted from the terminal, based on the DCI,
wherein the condition indicates that a transmitted information specifies at least one occasion of the plurality of PRACH transmission occasions,
wherein in a case where Listen Before Talk (LBT) indicates that one of the plurality of PRACH transmission occasions fails due to the result of LBT in a time unit, another one of the plurality of PRACH transmission occasions is used for PRACH transmission, and
wherein the PRACH transmission occurs if a received signal power measured during the time unit is equal to or lower than a predetermined threshold.

8. A radio communication method comprising:
transmitting a physical random access channel (PRACH); and
controlling the transmission of the PRACH, based on a condition, by using at least one of a scheduling of a plurality of PRACH transmission occasions in a time direction and a configuring of a plurality of PRACH transmission resources in a frequency direction,
wherein the condition indicates that a received information specifies at least one occasion of the plurality of PRACH transmission occasions,
wherein in a case where Listen Before Talk (LBT) indicates that one of the plurality of PRACH transmission occasions fails due to the result of LBT in a time unit, using another one of the plurality of PRACH transmission occasions for PRACH transmission, and
wherein the PRACH transmission occurs if a received signal power measured during the time unit is equal to or lower than a predetermined threshold.

* * * * *